United States Patent
Yasukouchi (10) Patent No.: US 11,320,019 B2
(45) Date of Patent: May 3, 2022

(54) TUBULAR MEMBER AND SHOCK ABSORBER

(71) Applicant: KYB CORPORATION, Tokyo (JP)

(72) Inventor: Naoki Yasukouchi, Tokyo (JP)

(73) Assignee: KYB CORPORATION, Tokyo (JP)

( * ) Notice: Subject to any disclaimer, the term of this patent is extended or adjusted under 35 U.S.C. 154(b) by 255 days.

(21) Appl. No.: 16/301,156

(22) PCT Filed: Jun. 23, 2017

(86) PCT No.: PCT/JP2017/023124
§ 371 (c)(1),
(2) Date: Nov. 13, 2018

(87) PCT Pub. No.: WO2018/003673
PCT Pub. Date: Jan. 4, 2018

(65) Prior Publication Data
US 2019/0293148 A1    Sep. 26, 2019

(30) Foreign Application Priority Data

Jun. 30, 2016    (JP) .............................. JP2016-129838

(51) Int. Cl.
*F16F 9/58*    (2006.01)
*B60G 13/00*    (2006.01)
(Continued)

(52) U.S. Cl.
CPC .............. *F16F 9/58* (2013.01); *B60G 13/005* (2013.01); *B60G 13/08* (2013.01); *F16F 9/19* (2013.01);
(Continued)

(58) Field of Classification Search
CPC ..... B62K 25/04; F16F 9/49; F16F 9/06; F16F 9/19; F16F 9/3235; F16F 9/38;
(Continued)

(56) References Cited

U.S. PATENT DOCUMENTS 6,224,264 B1 * 5/2001 Bohm ...................... A47B 9/20
    384/220
7,810,619 B2 * 10/2010 Maeda .................. F16F 9/3242
    188/322.17
(Continued)

FOREIGN PATENT DOCUMENTS

| JP | 2007-057088 A | 3/2007 |
| JP | 2009-222223 A | 10/2009 |
| JP | 2013-164092 A | 8/2013 |

OTHER PUBLICATIONS

Sep. 7, 2020, Chinese Office Action issued for related CN application No. 201780038273.7.
(Continued)

*Primary Examiner* — Bradley T King
*Assistant Examiner* — Mahbubur Rashid
(74) *Attorney, Agent, or Firm* — Paratus Law Group, PLLC (57) ABSTRACT

A bump cap includes: a tubular main body part; and three or more protrusions provided at different positions in a circumferential direction of an inner circumference of the main body part. A plurality of protrusions are press-fit protrusions having a radial height higher than a radial height of the other protrusions, and the number of the press-fit protrusions are smaller than the number of the other protrusions, and the bump cap is configured to be mounted on an outer circumference of an outer shell of a shock absorber in state where the press-fit protrusions are pushed against the outer circumference of the outer shell.

8 Claims, 6 Drawing Sheets

(51) Int. Cl.
*F16F 9/19* (2006.01)
*F16F 9/38* (2006.01)
*B60G 13/08* (2006.01)
*F16F 9/36* (2006.01)
*F16F 9/32* (2006.01)

(52) U.S. Cl.
CPC .................. *F16F 9/32* (2013.01); *F16F 9/36* (2013.01); *F16F 9/38* (2013.01); *B60G 2202/31* (2013.01); *B60G 2204/20* (2013.01); *B60G 2204/40* (2013.01); *F16F 2230/007* (2013.01)

(58) Field of Classification Search
CPC .......... F16F 9/3242; F16F 9/3207; F16F 9/54; F16F 9/32; B60G 17/0408; B60G 2204/128; B60G 13/005; B60G 15/067; B60G 2204/45; B60G 2204/4502; B60G 2206/40; B60G 7/04
See application file for complete search history.

(56) References Cited

U.S. PATENT DOCUMENTS

| | | | | |
|---|---|---|---|---|
| 8,418,821 | B2* | 4/2013 | Henneberg | B60G 13/00 188/322.12 |
| 9,022,188 | B2* | 5/2015 | Lee | F16F 9/36 188/322.17 |
| 9,777,791 | B2* | 10/2017 | Fukui | F16F 9/38 |
| 9,829,062 | B2* | 11/2017 | Tsunekawa | F16F 9/58 |
| 2002/0047231 | A1* | 4/2002 | Zietsch | B60G 13/003 267/217 |
| 2002/0189441 | A1* | 12/2002 | Collis | F16F 9/58 92/165 R |
| 2004/0168871 | A1* | 9/2004 | Handke | B60G 15/062 188/322.12 |
| 2009/0194379 | A1* | 8/2009 | Maeda | F16F 9/3242 188/322.22 |
| 2013/0043624 | A1* | 2/2013 | Kan | C04B 35/6365 264/653 |
| 2014/0239567 | A1* | 8/2014 | Suchta | B60G 15/061 267/220 |
| 2015/0202938 | A1* | 7/2015 | Manga | F16F 9/3242 267/64.23 |
| 2016/0084336 | A1* | 3/2016 | Tsunekawa | F16F 9/58 188/322.12 |

OTHER PUBLICATIONS

Sep. 29, 2020, Japanese Office Action issued for related JP application No. 2016-129838.

Mar. 31, 2020, Japanese Office Action issued for related JP Application No. 2016-129838.

Dec. 16, 2019, Chinese Office Action issued for related CN Application No. 201780038273.7.

* cited by examiner

TUBULAR MEMBER AND SHOCK ABSORBER

CROSS REFERENCE TO PRIOR APPLICATION

This application is a National Stage Patent Application of PCT International Patent Application No. PCT/JP2017/023124 (filed on Jun. 23, 2017) under 35 U.S.C. § 371, which claims priority to Japanese Patent Application No. 2016-129838 (filed on Jun. 30, 2016), which are all hereby incorporated by reference in their entirety.

TECHNICAL FIELD

The present invention relates to a tubular member and a shock absorber.

BACKGROUND ART

Conventionally, in some shock absorbers, an outer circumference of an outer shell is mounted with a tubular member such as a dust boot receiver that supports one end of a dust boot in the axial direction, or a bump cap with which a bump cushion abuts when a shock absorber is most contracted, and the tubular member is fixed by press fitting. For example, a tubular member disclosed in JP 2007-57088 A is a bump cap and includes a tubular main body part and a plurality of ribs provided along the circumferential direction on the inner circumference of the main body part. These ribs have an interference margin with respect to an outer shell, and are compressed when the outer shell is inserted.

SUMMARY OF THE INVENTION

However, when radial heights of the ribs are all the same as the bump cap disclosed in JP 2007-57088 A, there is a possibility that a press-fit failure occurs when a tubular member is mounted on the outer circumference of the outer shell.

More specifically, the dimension of each component of a shock absorber has tolerance, and the outer diameter dimension of the outer shell and the inner diameter dimension of the tubular member vary. Therefore, even when a tubular member having the maximum allowable inner diameter is mounted on an outer shell having the minimum allowable outer diameter, a rib is made to have a predetermined interference margin with respect to the outer shell, so that the tubular member does not come off even if there is product variation. Then, even when there are variations in dimensions of the outer shell and the tubular member, as long as the dimensions are within an allowable range, a minimum tightening force against the outer shell of the tubular member is maintained, so that when the shock absorber is in operation, the tubular member can be prevented from coming off the outer shell.

As described above, in the combination of the outer shell and the tubular member having variations in product dimensions, when the radial height of the rib is set so that the minimum value of the interference margin can be secured, the interference margin tends to become large. For this reason, for example, in the case of mounting a tubular member having a small inner diameter on an outer shell having a large outer diameter, depending on the combination, there is a possibility that a press-fit failure occurs in which the tubular member cracks when the outer shell is press-fitted into the tubular member, or the rib is scraped. However, if the radial height of the rib is lowered in order to prevent a press-fit failure, depending on the combination, the tightening force of the tubular member becomes insufficient and there is a possibility that other troubles can occur, such as a trouble in which, when the shock absorber is in operation or the like, the tubular member comes off from the outer shell. Therefore, such configuration cannot be adopted.

It is an object of the present invention to provide a tubular member and a shock absorber that can secure a tightening force against an outer shell of a tubular member while preventing a press-fit failure at the time of mounting.

The tubular member of the present invention has three or more protrusions provided at different positions in the circumferential direction of the inner circumference of a main body part, wherein the three or more protrusions include a plurality of press-fit protrusions and at least one auxiliary protrusion having a radial height lower than a radial height of the press-fit protrusions.

DESCRIPTION OF EMBODIMENTS

Embodiments of the present invention will be described below with reference to the drawings. Like reference numerals assigned throughout the several views indicate like parts.

Figure 1:
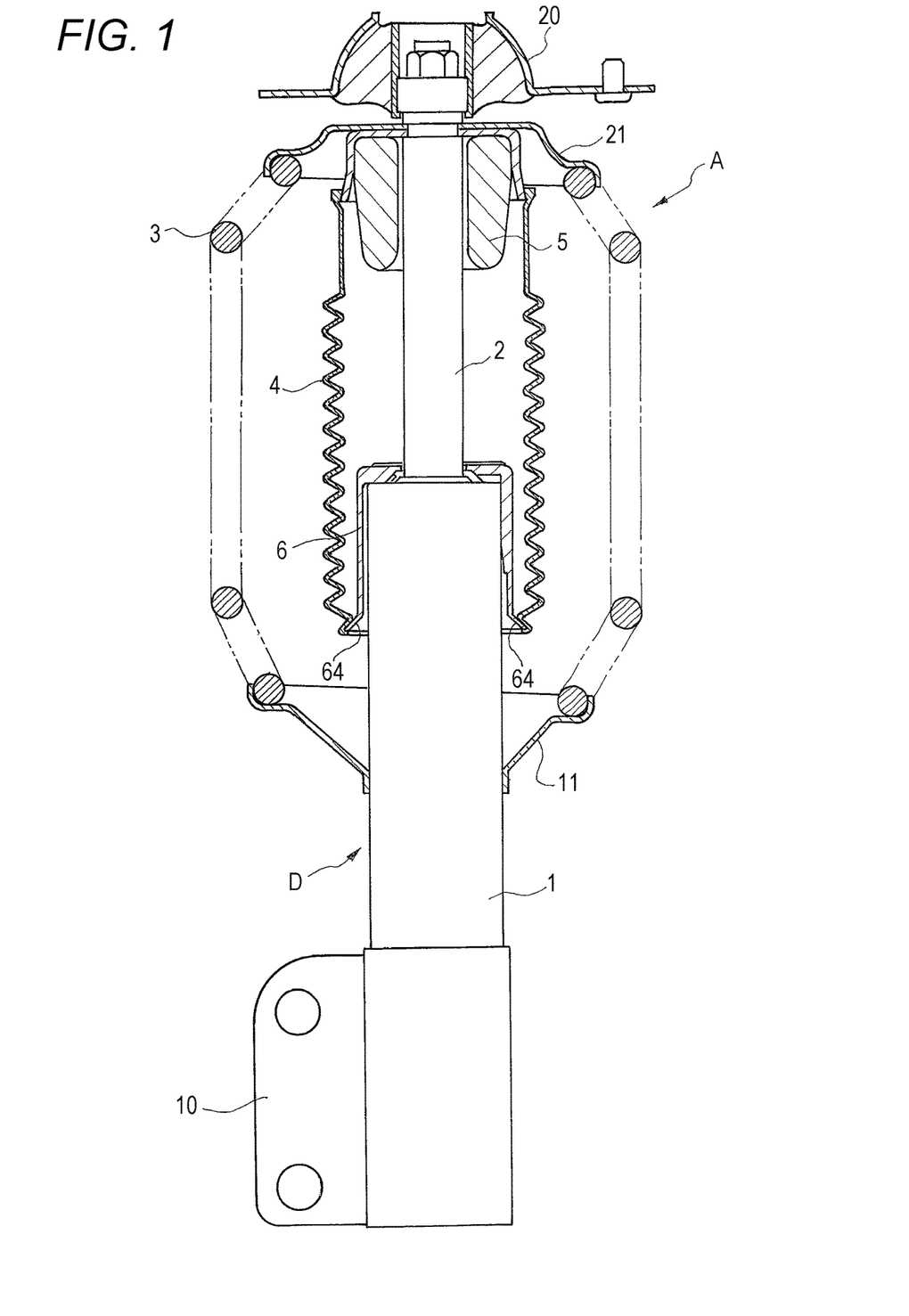
FIG. 1 is a partially cutaway front view showing a shock absorber according to an embodiment of the present invention.

A shock absorber A according to an embodiment of the present invention shown in FIG. 1 is interposed between a vehicle body of a vehicle such as a four-wheeled vehicle, and wheels. The shock absorber A includes: a shock absorber main body D having an outer shell 1 and a rod 2 to be inserted into the outer shell 1; a vehicle body side mount 20 that couples the rod 2 to the vehicle body; a bracket 10 that couples the outer shell 1 to an axle; a spring bearing 21 attached to a lower side in FIG. 1 of the vehicle body side mount 20 on the outer circumference of the rod 2; a spring bearing 11 fixed to the outer circumference of the outer shell 1; and a suspension spring 3 interposed between the spring bearings 21, 11.

When a shock due to road surface irregularities is input to the wheel, the rod 2 enters and exits the outer shell 1 so that the shock absorber main body D expands and contracts, and the spring bearings 21, 11 are moved close or away so that the suspension spring 3 expands and contracts. When the shock absorber A expands and contracts as described above, the suspension spring 3 exerts an elastic force commensurate with the compression amount, and the shock absorber main body D exerts a damping force to suppress the expansion and contraction movement of the suspension spring 3. That is, in the shock absorber A, the vehicle body can be elastically supported by the suspension spring 3.

The shock absorber A further includes: a tubular dust boot 4 that covers the outer circumference of the rod 2 protruding upward in FIG. 1 of the outer shell 1; an annular bump cushion 5 held on the upper outer circumference of the rod 2; and a bottomed tubular bump cap 6 as a tubular member to be mounted on the upper end outer circumference of the outer shell 1.

When the shock absorber A contracts most, the bump cushion 5 abuts with the bump cap 6, and is elastically deformed to alleviate the shock at the time of maximum contraction. A lower end portion of the dust boot 4 in FIG. 1 is supported by a dust boot receiver 64 provided on the bump cap 6, and the dust boot 4 also expands and contracts as the shock absorber A expands and contracts. Since the dust boot 4 has a bellows-like shape and easily expands and contracts, the dust boot 4 does not hinder the expansion and contraction of the shock absorber A. The dust boot 4 also protects the outer circumference of the rod 2, and prevents the rod 2 from being scratched by flying stones or the like from a road surface and foreign substances such as earth and dust from adhering to the outer circumference of the rod 2.

Each member composing the shock absorber A will be described below. Since the configuration of the shock absorber main body D is well known, its detailed illustration is omitted. The shock absorber main body D includes, in addition to the outer shell 1 and the rod 2 described above, a cylinder provided inside the outer shell 1, and a piston slidably inserted to the cylinder. The lower end of the rod 2 in FIG. 1 is coupled to the piston. Two chambers filled with a liquid such as hydraulic oil are formed in the cylinder. When the shock absorber A expands and contracts and the piston moves in the axial direction inside the cylinder, a differential pressure is generated in the above two chambers, and a damping force that hinders expansion and contraction is generated.

A liquid reservoir chamber for storing liquid is formed between the outer shell 1 and the cylinder. This liquid reservoir chamber can communicate with the inside of the cylinder to compensate for the change in volume inside the cylinder by the volume of the rod entering and exiting the cylinder and to compensate for the change in volume of liquid in the cylinder due to temperature change. In this way, the shock absorber A has a double-cylinder type having a cylinder arranged double in inside and outside, and the outer shell 1, and composes a reservoir for storing liquid therein by the cylinder and the outer shell 1.

The configuration of the shock absorber main body D is not limited to the above. For example, the reservoir may be a separately placed tank provided side by side outside the cylinder, or a movable partition wall may be provided such as a free piston, bladder or bellows, which forms an inflatable and contractible air chamber in the cylinder, so that compensation is performed in the air chamber for the change in the capacity of in the cylinder corresponding to the projecting and retracting volume of the rod and the change in the volume of the liquid due to the temperature change. In such a case, the shock absorber A can be made into a single cylinder type by utilizing the outer shell 1 as a cylinder. The shock absorber A is a single rod type, and the rod 2 extends from one side of the piston to the outside of the cylinder. However, double rod type may be adopted, in which the rod 2 may extend from both sides of the piston to the outside of the cylinder. Although the shock absorber A is a hydraulic shock absorber utilizing fluid force, the shock absorber A may be a pneumatic shock absorber or a shock absorber other than that.

Figure 2:
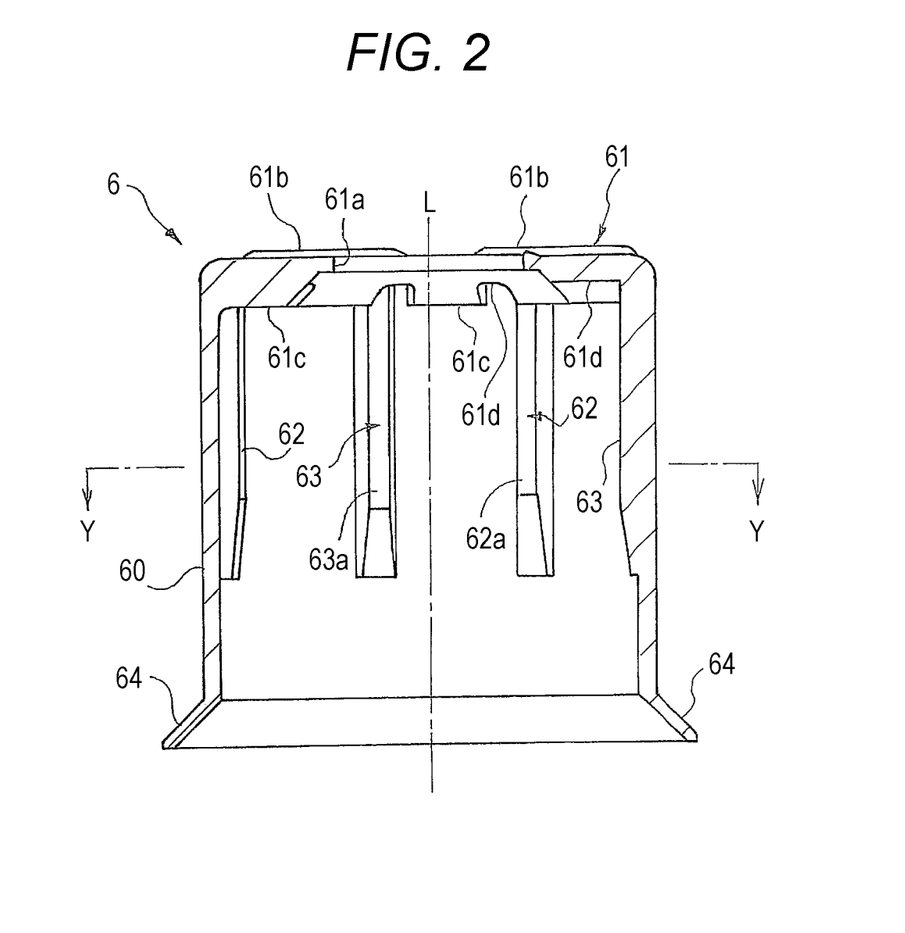
FIG. 2 is an enlarged longitudinal cross-sectional view of a bump cap of the shock absorber according to the embodiment of the present invention, and is a cross-sectional view taken along line X-O-X in FIG. 3.

Subsequently, the bump cap 6 mounted on the outer circumference of the upper end portion of the outer shell 1 is formed of a synthetic resin such as nylon. As shown in FIG. 2, the bump cap 6 includes: a tubular main body part 60; a bottom part 61 that covers an upper end opening of the main body part 60; a plurality of protrusions (a press-fit protrusion 62 and an auxiliary protrusion 63) extending in the inner circumference of the main body part 60 along the axial direction and aligned in the circumferential direction; and a dust boot receiver 64 continuing to the lower end of the main body part 60. There are two types of protrusions, that is, a high protrusion and a low protrusion in the radial height, and the high protrusion is the press-fit protrusion 62, and the low protrusion is the auxiliary protrusion 63.

Figure 3:
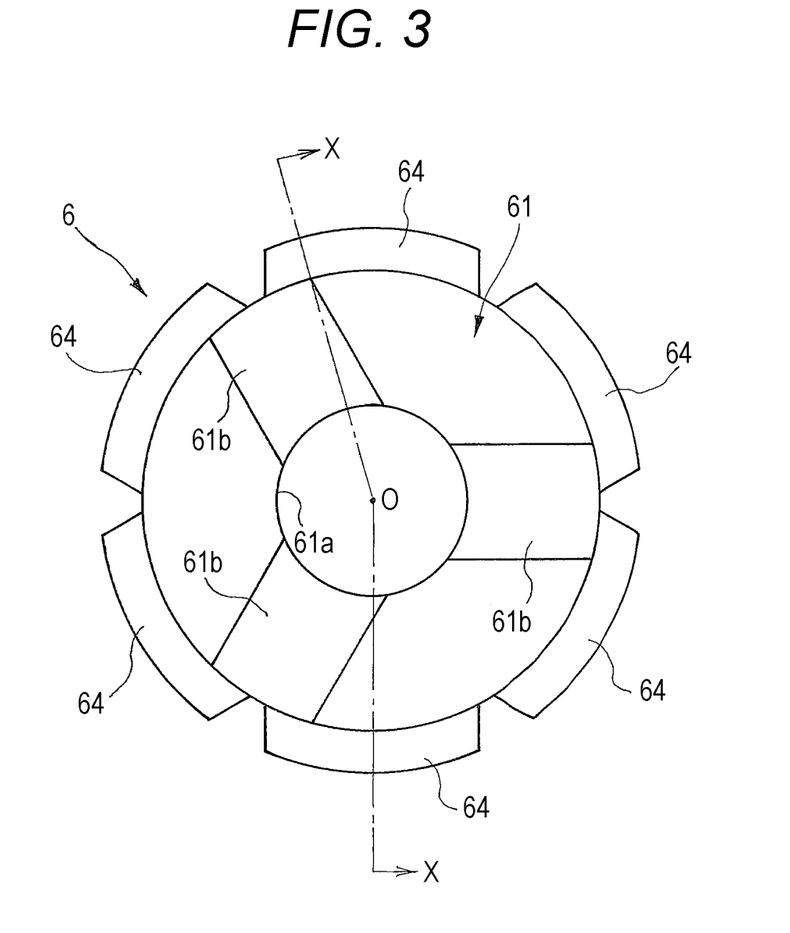
FIG. 3 is an enlarged plan view showing the bump cap of the shock absorber according to the embodiment of the present invention.
Figure 4:
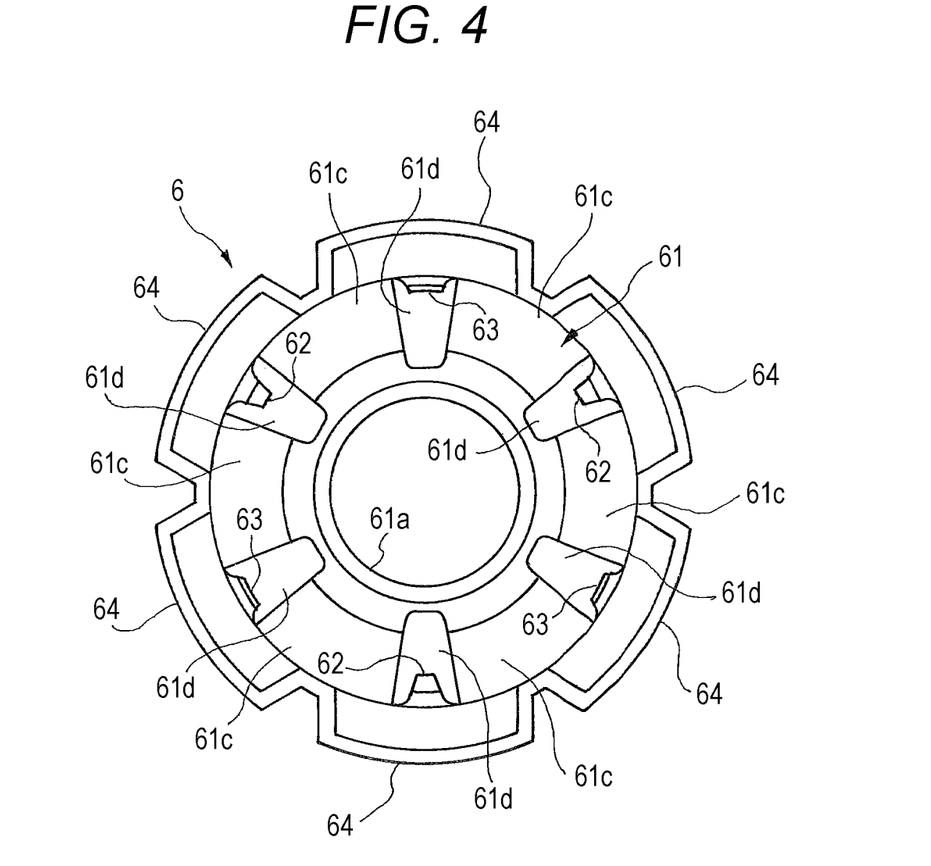
FIG. 4 is an enlarged bottom view showing the bump cap of the shock absorber according to the embodiment of the present invention.

As shown in FIGS. 2 to 4, the bottom part 61 has an annular plate shape, and formed with an insertion hole 61a penetrating the bottom part 61 in the thickness direction at the center portion of the bottom part 61 and allowing insertion of the rod 2. In the bottom part 61, a side facing the inside of the bump cap 6 (the space surrounded by the main body part 60 and the bottom part 61) (the lower side in FIG. 2) is considered to be an inside, and a side facing the outside of the bump cap 6 (the upper side in FIG. 2) is considered to be an outside.

As shown in FIG. 3, three ridges 61b radially extending from an edge of the insertion hole 61a toward the outer circumferential edge of the bottom part 61 are formed on the outside of the bottom part 61. Therefore, it is possible to suppress the occurrence of abnormal noise when the bump cushion 5 collides with the outer surface of the bottom part 61 when the shock absorber A contracts most. Although the bump cushion 5 is formed of an elastomer such as elastic rubber or synthetic resin, the bump cushion 5 may be a spring. The shape of the portion that receives the bump cushion 5 such as the number or the shape of the ridges 61b may be changed in accordance with the shape, the type, or the like of the bump cushion 5 used.

As shown in FIG. 4, convex part 61c and concave part 61d are formed alternately side by side in the circumferential direction inside the bottom part 61. As shown in FIG. 2, the convex part 61c is a portion where the axial protrusion height toward the inside of the bump cap 6 is high, and on the other hand, the lower portion is the concave part 61d. The numbers of the convex part 61c and the number of the concave part 61d are both equal to the number of the press-fit protrusion 62 and the auxiliary protrusion 63 (the total number of protrusions) and are six in the present embodiment.

As shown in FIG. 4, the concave part 61d is provided at a position overlapping with the press-fit protrusion 62 or the auxiliary protrusion 63 as viewed in the axial direction. The lateral width of each protrusion is set to fall within the range of the lateral width of the concave part 61d. Therefore, the tip end of the outer shell 1 can be reliably abutted against the convex part 61c.

Figure 5:
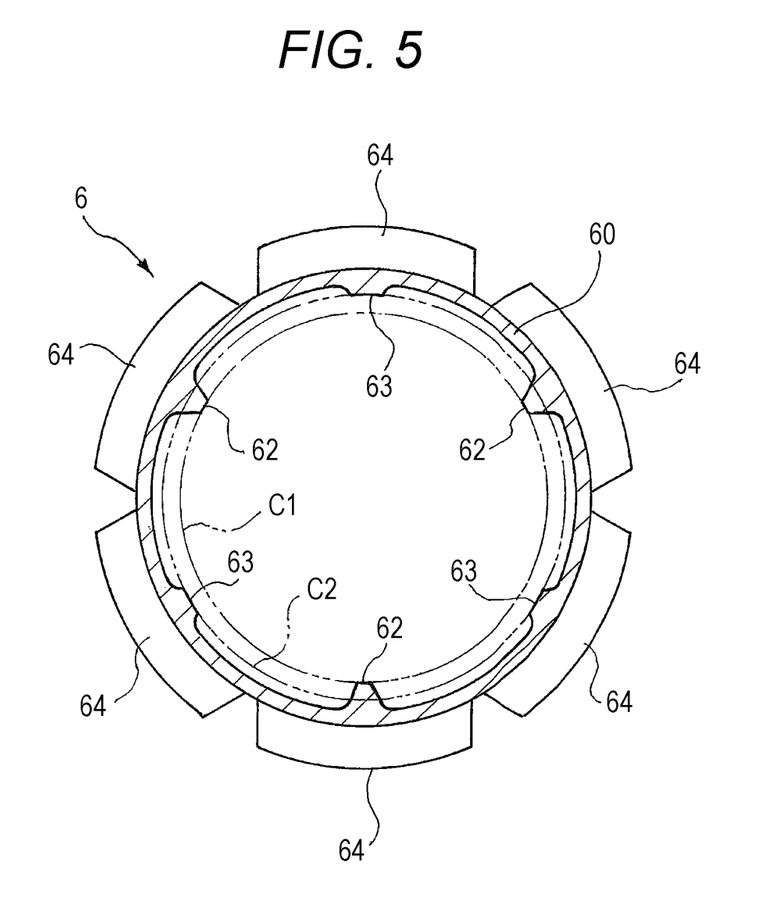
FIG. 5 is an enlarged transverse cross-sectional view of the bump cap of the shock absorber according to the embodiment of the present invention, and is a cross-sectional view taken along line Y-Y in FIG. 2.

Subsequently, as shown in FIG. 2, the press-fit protrusion 62 and the auxiliary protrusion 63 are all solid ribs and extend along the axial direction on the inner circumference of the main body part 60. As shown in FIG. 4 and the like, three press-fit protrusions 62 and three auxiliary protrusions 63 are provided, and are arranged alternately at equal intervals in the circumferential direction on the inner circumference of the main body part 60. The protrusion amount of the protrusion protruding from the inner circumferential surface of the main body part 60 toward a center line L (FIG. 2) passing through a center O (FIG. 3) of the bump cap 6 is the radial height of the protrusion, and as shown in FIG. 5, the radial height of the press-fit protrusion 62 is higher than the radial height of the auxiliary protrusion 63.

The press-fit protrusion 62 has the interference margin equal to or greater than a predetermined amount with respect to the outer shell 1 if both dimensions of the bump cap 6 and the outer shell 1 are within the tolerance range. Particularly, in the bump cap 6 having the maximum allowable inner diameter, the diameter of a circle C1 which has the center on the center line L (FIG. 2) of the bump cap 6 and connects the vertices of the three press-fit protrusions 62 is smaller by a certain amount than the outer diameter of the outer shell 1 having the minimum allowable outer diameter.

Therefore, when the outer shell 1 is mounted on the bump cap 6, the press-fit protrusion 62 is necessarily compressed and elastically deformed, and pressed against the outer circumference of the outer shell 1. The amount of compression at this time is the interference margin of the press-fit protrusion 62. When the shock absorber A is used, even when a force is applied from the bump cap 6 in a direction of pulling out the outer shell 1 or a vibration is input, the lower limit value of the interference margin is set so that a tightening force of a degree that the bump cap 6 does not come off from the outer shell 1 can be obtained.

The auxiliary protrusions 63 are set so that, when both the bump cap 6 and the outer shell 1 have the optimal dimensions, the diameter of a circle C2 which has the center on the center line L (FIG. 2) of the bump cap 6 and connects the vertices of the three auxiliary protrusions 63 is larger than the outer diameter of the outer shell 1. The auxiliary protrusion 63 is set so that the vertex portion (hereinafter referred to as a vertex portion) of the auxiliary protrusion 63 is pressed against the outer circumference of the outer shell 1 in a state where the outer shell 1 is press-fitted into the bump cap 6.

Figure 6:
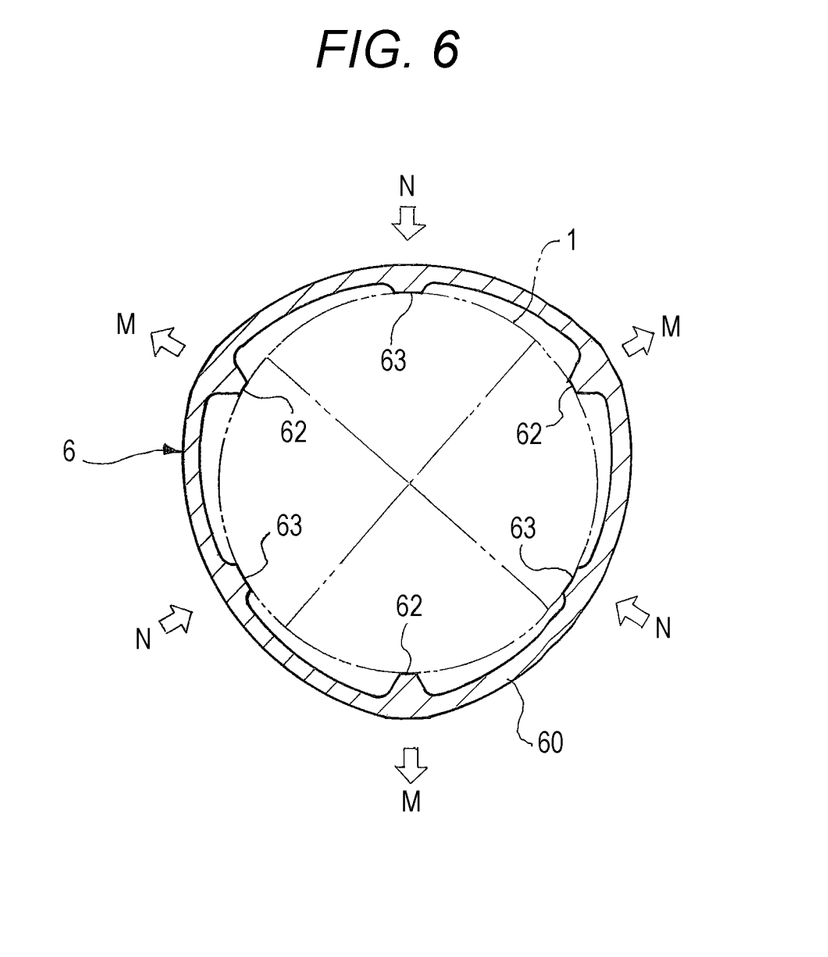
FIG. 6 is a cross-sectional end view showing an end face when the bump cap mounted on the outer shell is enlarged and cut along line Y-Y in FIG. 2, in the shock absorber according to the embodiment of the present invention.

More specifically, as shown in FIG. 6, when the outer shell 1 is inserted into the inside of the bump cap 6, the press-fit protrusion 62 is compressed and pushed out toward the radial outer circumferential side by the outer shell 1, and the inner diameter of the portion of the press-fit protrusion 62 in the bump cap 6 slightly expands (arrow M). At this time, as described above, when the diameter of the circle C2 connecting the vertices of the auxiliary protrusions 63 is larger than the outer diameter of the outer shell 1, the auxiliary protrusions 63 can move to the radial center side until abutting against the outer shell 1. Therefore, at the time of press fitting, the inner diameter of the auxiliary protrusion 63 portion in the bump cap 6 is reduced (arrow N).

That is, when the difference between the outer diameter of the outer shell 1 and the inner diameter of the bump cap 6 is optimum, the auxiliary protrusion 63 does not have a dimensional interference margin with respect to the outer shell 1. However, when the bump cap 6 is deformed by press fitting of the outer shell 1, the auxiliary protrusion 63 is pressed against the outer circumference of the outer shell 1.

As shown in FIG. 2, the radial height of the press-fit protrusion 62 and the auxiliary protrusion 63 is substantially constant in the axial direction, and a gradient part in which the radial height gradually decreases toward the lower end is provided in the lower end portion of the press-fit protrusion 62 and the auxiliary protrusion 63. Therefore, when the outer shell 1 is inserted to the bump cap 6, the outer shell 1 is guided to the gradient part of the protrusion, and the outer shell 1 is easily pushed toward the back (the bottom part side) of the bump cap 6.

In this way, when the radial heights of the protrusions are different in the axial direction, in a state where the bump cap 6 is mounted on the outer circumference of the outer shell 1, a portion facing the outer circumferential surface (tubular side surface) of the outer shell 1 in the radial direction (front and rear, right and left in FIG. 1), and being the highest in the radial height is considered as a protrusion main body, and the height of the protrusion main body is measured as the radial height of the protrusions. The top of the protrusion is on the protrusion main body. In FIG. 2, 62a is a protrusion main body of the press-fit protrusion 62, and 63a is a protrusion main body of the auxiliary protrusion 63.

As shown in FIG. 4 and the like, the lateral width of the press-fit protrusion 62 and the auxiliary protrusion 63 is wide at the root side (the outer circumferential side of the bump cap 6) and narrows toward the top. Therefore, when a synthetic resin is poured into a metal mold by injection molding or the like, and the bump cap 6 is integrally molded with the synthetic resin, it is easy to fill the protruding portion with the synthetic resin. The bump cap 6 may be formed of metal, and the shapes of the press-fit protrusion 62 and the auxiliary protrusion 63 may be appropriately changed.

Subsequently, six dust boot receivers 64 are provided side by side in the circumferential direction of the bump cap 6. As shown in FIG. 2, each dust boot receiver 64 has an upper end continuing to the lower end of the main body part 60 and inclines so as to be away from the center line L toward the lower end. The tip end portion of the dust boot 4 is supported by the outer circumference of the dust boot receiver 64 aligned in the circumferential direction, and the tip end of the dust boot receiver 64 is caught by the tip end of the dust boot 4 (FIG. 1). In FIG. 2, the cut end surfaces of the dust boot receiver 64 on the right and left sides are shown, and detailed shapes are not illustrated.

The number and shape of the dust boot receiver 64 may be appropriately changed as long as the dust boot receiver 64 can support one end of the dust boot 4 in the axial direction and perform positioning of one end of the dust boot 4.

Hereinafter, the operation of the shock absorber A according to the present embodiment will be described. When the rod 2 enters and exits the outer shell 1 and the shock absorber A expands and contracts, the dust boot 4 expands and contracts in a state where the lower end portion of the dust boot 4 in FIG. 1 is supported by the dust boot receiver 64. At the time of expansion and contraction of the shock absorber A, since the lower end portion of the dust boot 4 is caught by the dust boot receiver 64, when the protrusion amount of the rod 2 with respect to the outer shell 1 increases, the dust boot 4 is stretched, and a force may be applied in a direction in which the bump cap 6 is pulled up, that is, in a direction in which the outer shell 1 is pulled out from the bump cap 6. In the shock absorber A, even in such a case, the bump cap 6 does not come off from the outer shell 1.

The reason is as follows. In the following description, it is assumed that the actual sizes of the outer shell 1 and the bump cap 6 as single products are within an allowable range.

Due to the product dimension (actual dimension) before mounting of the bump cap, in a case where the difference between the inner diameter of the bump cap 6 and the outer diameter of the outer shell 1 is the optimum value and in the peripheral region thereof (hereinafter referred to as the optimum region), when the outer shell 1 is inserted into the bump cap 6, the press-fit protrusion 62 is compressed and pushed out toward the radial outer circumferential side, and the inner diameter of the press-fit protrusion 62 portion in the bump cap 6 expands (arrow M in FIG. 6). Then, the inner diameter of the auxiliary protrusion 63 portion in the bump cap 6 decreases, and the top of the auxiliary protrusion 63 abuts with the outer circumference of the outer shell 1 (arrow N in FIG. 6).

In this case, since the interference margin of the press-fit protrusion 62 against the outer shell 1 is sufficiently secured, a sufficient tightening force of the bump cap 6 against the outer shell 1 can be obtained. Therefore, due to the frictional force generated between the bump cap 6 and the outer shell 1, even when a force is applied in a direction of pulling out the outer shell 1 from the bump cap 6 during operation of the shock absorber A, the bump cap 6 does not come off from the outer shell 1. Since the outer shell 1 is supported by both of the press-fit protrusion 62 and the auxiliary protrusion 63, prevention of coming off of the bump cap 6 is more reliably performed.

When the outer shell 1 is pressed to fit into the bump cap 6, the inner diameter of the auxiliary protrusion 63 portion of the bump cap 6 can be reduced (FIG. 6), so that the stress can be released. Therefore, when the bump cap 6 is mounted on the outer shell 1, the stress applied to the bump cap 6 does not become excessive, and cracking of the bump cap 6 can be prevented. Also, the protrusions of the bump cap 6 do not get scraped when mounted. Since the outer shell 1 is supported by both the press-fit protrusion 62 and the auxiliary protrusion 63 as described above, it is possible to prevent the outer shell 1 from being inclined in the bump cap 6.

Subsequently, due to the product dimension before the mounting of the bump cap, in a case where the difference between the inner diameter of the bump cap 6 and the outer diameter of the outer shell 1 is smaller than the optimum region, even when the inner diameter of the auxiliary protrusion 63 portion in the bump cap 6 decreases, a gap may be formed between the auxiliary protrusion 63 and the outer shell 1 in some cases. Even in this case, the interference margin of the press-fit protrusion 62 against the outer shell 1 is equal to or a predetermined amount, and a tightening force of the bump cap 6 against the outer shell 1 can be secured. Therefore, even when a force is applied in a direction of pulling out the outer shell 1 from the bump cap 6 during operation of the shock absorber A, the bump cap 6 does not come off from the outer shell 1.

On the contrary, due to the product dimension before the mounting of the bump cap, in a case where the difference between the inner diameter of the bump cap 6 and the outer diameter of the outer shell 1 is larger than the optimum region, the diameter of the circle C2 connecting vertices of the auxiliary protrusions 63 is smaller than the outer diameter of the outer shell 1 in some cases. As described above, even when the auxiliary protrusion 63 has an interference margin with respect to the outer shell 1, since the radial height of the auxiliary protrusion 63 is lower than the radial height of the press-fit protrusion 62, the interference margin of the auxiliary protrusion 63 is smaller than that of the press-fit protrusion 62. That is, even when the interference margin of the press-fit protrusion 62 becomes large, it is possible to suppress the increase in the interference margin around the entire circumference of the bump cap 6, so that when the bump cap 6 is mounted, a press-fit failure such as cracking or scraping can be prevented from occurring.

As described above, in the bump cap 6, even when the tightening force of the bump cap 6 against the outer shell 1 is secured by the press-fit protrusion 62 and the bump cap 6 having the maximum allowable inner diameter is mounted on the outer shell 1 having the minimum allowable outer diameter, the strength against coming off of the outer shell 1 is secured, and the bump cap 6 does not come off during operation of the shock absorber A. In addition, since the height of the protrusion (the auxiliary protrusion 63) other than the press-fit protrusion 62 is made lower in the bump cap 6, even when the bump cap 6 having the minimum allowable inner diameter is mounted to the outer shell 1 having the maximum allowable outer diameter, a press-fit failure does not occur.

Hereinafter, the action and effect of the shock absorber A according to the present embodiment will be described. The bump cap (tubular member) 6 includes the bottom part 61 that covers the opening on one side in the axial direction of the main body part 60 and with which the bump cushion 5 abuts at the time of maximum contraction of the shock absorber A. That is, in the shock absorber A, a tubular member mounted on the outer circumference of the outer shell 1 functions as a bump cap. The bump cap (tubular member) 6 includes the dust boot receiver 64 protruding from the main body part 60 toward the radial outer circumferential side, and supports one end in the axial direction of the dust boot 4 with the dust boot receiver 64. That is, in the shock absorber A, a tubular member mounted on the outer circumference of the outer shell 1 functions not only as a bump cap but also as a dust boot support member. Generally, since the bump cap and the dust boot support member are parts press-fitted and fixed to the outer circumference of the outer shell of the shock absorber, it is preferable to apply the present invention to these parts.

As in the shock absorber A, when positioning of the end portion of the dust boot 4 is performed by catching the end portion by the dust boot receiver 64, when the shock absorber A is extended, a force is applied in a direction of pulling out the outer shell 1 from the bump cap 6 in some cases. That is, in a tubular member having a dust boot receiver and performing positioning of the end portion of the dust boot with the dust boot receiver, it is necessary to increase the interference margin of the tubular member with respect to the outer shell. As the required interference margin increases, a press-fit failure tends to occur. Thus, application of the present invention to such a tubular member is particularly effective.

The tubular member may function only as a bump cap, and in this case, the dust boot receiver 64 can be omitted. The tubular member may function only as a dust boot support member. In this case, the bottom part 61 can be omitted, and the attachment position can be appropriately changed. For example, the tubular member may be attached to the center portion in the axial direction of the outer shell 1.

In the shock absorber A, in a state before the bump cap (tubular member) 6 is mounted on the outer shell 1, the diameter of a circle C2 which has the center on the center line L of the bump cap 6 and connects the vertices of auxiliary protrusions (other protrusions) 63 is larger than the outer diameter of the outer shell 1 in some cases. When such a bump cap 6 is mounted on the outer shell 1, occurrence of a press-fit failure at the time of mounting of the bump cap 6 can be prevented more reliably.

In the shock absorber A, in a state where the bump cap (tubular member) 6 is mounted on the outer circumference of the outer shell 1, the auxiliary protrusions (other protrusions) 63 abut with the outer circumference of the outer shell 1 in some cases. In the bump cap 6 mounted in this way, since the outer shell 1 can be supported by both the press-fit protrusion 62 and the auxiliary protrusion 63, the bump cap 6 can be prevented from coming off from the outer shell 1 more reliably. In addition, inclination of the outer shell 1 in the bump cap 6 can be prevented.

In a state where the bump cap 6 is mounted on the outer circumference of the outer shell 1, when it is difficult to confirm that both of the press-fit protrusion 62 and the auxiliary protrusion 63 abut with the outer circumference of the outer shell 1, the above confirmation may be performed by measuring the dimensions of the bump cap 6 detached from the outer shell 1 and the outer shell 1 to which the bump cap 6 has been mounted. For example, in the detached bump cap 6, when the press-fit protrusion 62 and the auxiliary protrusion 63 face each other in the radial direction (arranged on a straight line passing through the diameter of the main body part 60), the distance between the vertex of the press-fit protrusion 62 and the vertex of the auxiliary protrusion 63 facing each other is smaller than the outer diameter of the outer shell 1, it can be considered that these have been in contact with the outer circumference of the outer shell 1 at the time of mounting. When three or more press-fit protrusions 62 and three or more auxiliary protrusions 63 are provided in the detached bump cap 6, if the length obtained by summing the radius of the circle connecting the tops of all the press-fit protrusions 62 and the radius of the circle connecting the tops of all the auxiliary protrusions 63 is smaller than the outer diameter of the outer shell 1, it can be considered that both the press-fit protrusion 62 and the auxiliary protrusion 63 have been in contact with the outer circumference of the outer shell 1 at the time of mounting.

In the shock absorber A, the lower end in FIG. 2 of the protrusion main body 63*a* of the auxiliary protrusion (other protrusion) 63 is arranged slightly lower than the lower end of the protrusion main body 62*a* of the press-fit protrusion 62. The lower side in FIG. 2 is the inlet side of the outer shell 1 when the outer shell 1 is inserted into the main body part 60 and the bump cap 6 is mounted on the outer circumference of the outer shell 1. Therefore, with the above configuration, it is possible to suppress the inclination of the outer shell 1 with respect to the center line L when the bump cap 6 is mounted, by the auxiliary protrusion 63. Even when the auxiliary protrusion 63 abuts with the outer shell 1, since the contact surface pressure of this portion is low, the resistance at the time of press fitting does not become large and the bump cap 6 can be prevented from becoming difficult to mount. Therefore, a press-fit failure at the time of mounting of the bump cap 6 can be prevented more reliably.

In the shock absorber A, the axial length of the protrusion main body 63*a* of the auxiliary protrusion 63 is longer than the axial length of the protrusion main body 62*a* of the press-fit protrusion 62. However, the protrusion main body 63*a* of the auxiliary protrusion 63 and the protrusion main body 62*a* of the press-fit protrusion 62 may be shifted vertically in FIG. 2, and the lower end of the protrusion main body 63*a* (the end portion on an inlet side) may be arranged on the lower side (an inlet side) than the lower end of the protrusion main body 62*a* (the end portion on the inlet side). The configurations of the press-fit protrusion 62 and the auxiliary protrusion 63 are not limited to the above, and can be appropriately changed. Such a change is possible regardless of the configuration of the tubular member.

In the bump cap 6, the total number of protrusions is six, and three press-fit protrusions 62 and three auxiliary protrusions (other protrusions) 63 are alternately arranged in the circumferential direction. Thus, since the stress applied to the bump cap 6 at the time of mounting the bump cap 6 on the outer shell 1 is easy to be released, occurrence of a press-fit failure can be prevented more reliably. In order to obtain such an effect, it is sufficient that the total number of the protrusions is an even number of four or more and the press-fit protrusion 62 and the auxiliary protrusion 63 are alternately arranged. In a case where the number of protrusions is an odd number and the press-fit protrusions 62 or the auxiliary protrusions 63 are adjacent to each other, the similar effect may be obtained in some cases.

Examples of such a case include a case where, when one protrusion group in which the total number of protrusions is a multiple of three, is composed of three, that is, one press-fit protrusion 62 and two auxiliary protrusions 63, 63 arranged on both sides of the press-fit protrusion 62, and a plurality of protrusion groups are provided at different positions in the circumferential direction, or a case where one protrusion group is composed of three, that is, one auxiliary protrusion 63 and two press-fit protrusions 62, 62 arranged on both sides of the auxiliary protrusion 63, and a plurality of protrusion groups are provided at different positions in the circumferential direction. In the former case, the press-fit protrusion 62, the auxiliary protrusion 63, and the auxiliary protrusion 63 repeatedly appear in the circumferential direction in this order. In the latter case, the press-fit protrusion 62, the press-fit protrusion 62, and the auxiliary protrusion 63 repeatedly appear in the circumferential direction in this order.

Even when the auxiliary protrusion 63 does not abut with the outer shell 1, it is preferable to provide three or more press-fit protrusions 62 in order to prevent the outer shell 1 from being inclined in the bump cap 6. However, the number of protrusions may be any other than the above, as long as the number of the press-fit protrusions 62 is plural, and the total number of the protrusions is three or more. Such a change is possible regardless of the configuration of the tubular member and the axial length of each protrusion.

The bump cap 6 has two types of protrusions (press-fit protrusion 62, auxiliary protrusion 63) having different radial heights. However, the radial height of the protrusion may be changed to three or more stages, as long as at least the protrusion having the highest radial height has the minimum interference margin with respect to the outer shell 1 and functions as the press-fit protrusion 62. Such a change is possible regardless of the configuration of the tubular member, and the axial length and the number of protrusions.

The shock absorber A includes the bump cap (tubular member) 6. The bump cap 6 includes the tubular main body part 60 and three or more protrusions provided at different positions in the circumferential direction of the inner circumference of the main body part 60. The three or more protrusions include a plurality of press-fit protrusions 62 and at least one auxiliary protrusion 63 having a radial height lower than a radial height of the press-fit protrusions 62. In a state where at least the press-fit protrusion 62 is pushed against the outer circumference of the outer shell 1 of the shock absorber A, the bump cap (tubular member) 6 is mounted on the outer circumference of the outer shell 1. In this way, in order to push the press-fit protrusion 62 against the outer circumference of the outer shell 1, it is sufficient that the press-fit protrusion 62 is set so as to have an interference margin with respect to the outer shell 1.

According to the above configuration, since the bump cap 6 includes the press-fit protrusion 62, if the interference margin of the press-fit protrusion 62 is set to a predetermined interference margin or more in consideration of the product variation, the tightening force of the bump cap 6 against the outer shell 1 can be secured so that the bump cap 6 is prevented from coming off from the outer shell 1. Since the radial height of other protrusions (the auxiliary protrusions 63) is lower than the radial height of the press-fit protrusion 62, even when the other protrusions abut with the outer circumference of the outer shell 1, the interference margin of the corresponding portion is smaller than the interference margin of the press-fit protrusion 62. For this reason, even if there are variations in the products, an increase in the interference margin around the entire circumference of the bump cap 6 can be prevented. Therefore, while securing the tightening force of the bump cap 6 against the outer shell 1, it is also possible to prevent a press-fit failure at the time of mounting.

Although the preferred embodiments of the present invention have been described in detail, modifications, variations and changes can be made without departing from the scope of the claims.

The invention claimed is:

1. A tubular member comprising:
a tubular main body part;
a plurality of press-fit protrusions provided on an inner circumference of the main body part; and
at least one auxiliary protrusion provided on the inner circumference of the main body part and having a radial height lower than a radial height of the press-fit protrusions, wherein
the press-fit protrusions and the auxiliary protrusion are provided at respective positions as viewed in the axial direction of the main body part, whereby none of the respective positions are overlapping each other,
the tubular member is configured to be mounted on an outer circumference of an outer shell of a shock absorber in state where the press-fit protrusions are pushed against the outer circumference of the outer shell,
the press-fit protrusions are configured such that a diameter of a circle that connects vertices of the press-fit protrusions is smaller than an outer diameter of the outer shell, and have an interference margin that can be obtained a tightening force that the tubular member does not come off from the outer shell, and
in a state of being mounted on the outer circumference of the outer shell, the auxiliary protrusion abuts with the outer circumference of the outer shell.

2. The tubular member according to claim 1, wherein
a side at which the outer shell is inserted into the main body part is an inlet side, and
an end portion on the inlet side of a portion being highest of the auxiliary protrusion in a radial height is positioned closer to the inlet side than an end portion on the inlet side of a portion being highest of the press-fit protrusions in a radial height.

3. The tubular member according to claim 1, wherein
a total number of the press-fit protrusions and the auxiliary protrusions is an even number, and
the press-fit protrusions and the auxiliary protrusions are arranged alternately in a circumferential direction.

4. The tubular member according to claim 1, further comprising
a dust boot receiver protruding from the main body part toward a radial outer circumferential side, wherein
the dust boot receiver supports one end in an axial direction of a dust boot.

5. The tubular member according to claim 4, wherein
an end portion of the dust boot is caught by the dust boot receiver.

6. The tubular member according to claim 1, further comprising
a bottom part that covers an opening on one side in an axial direction of the main body part and with which a bump cushion abuts when the shock absorber is most contracted.

7. The tubular member according to claim 1, wherein
the press-fit protrusions and the auxiliary protrusion are arranged at a same height position in the axial direction of the main body part and also arranged along the inner circumference of the main body part.

8. A shock absorber comprising:
a shock absorber main body having an outer shell, and a rod inserted into the outer shell; and
a tubular member mounted on an outer circumference of the outer shell, wherein
the tubular member comprises:
a tubular main body part;
a plurality of press-fit protrusions provided on an inner circumference of the main body part; and
at least one auxiliary protrusion provided on the inner circumference of the main body part and having a radial height lower than a radial height of the press-fit protrusions, wherein
the press-fit protrusions and the auxiliary protrusion are provided at respective positions as viewed in the axial direction of the main body part, whereby none of the respective positions are overlapping each other,
the tubular member is configured to be mounted on the outer circumference of the outer shell in state where the press-fit protrusions are pushed against the outer circumference of the outer shell,
the press-fit protrusions are configured such that a diameter of a circle that connects vertices of the press-fit protrusions is smaller than an outer diameter of the outer shell, and have an interference margin that can be obtained a tightening force that the tubular member does not come off from the outer shell, and
in a state of being mounted on the outer circumference of the outer shell, the auxiliary protrusion abuts with the outer circumference of the outer shell.

* * * * *